United States Patent
Gamache et al.

(10) Patent No.: US 9,440,872 B2
(45) Date of Patent: Sep. 13, 2016

(54) PROCESS FOR TREATING BRINE RECOVERED FROM A COAL SEAM GAS OPERATION

(71) Applicant: Veolia Water Solutions & Technologies North America Inc., Moon Township, PA (US)

(72) Inventors: David E. Gamache, Oswego, IL (US); Timothy J. Rittof, West Chicago, IL (US)

(73) Assignee: Veolia Water Technologies, Inc., Moon Township, PA (US)

(*) Notice: Subject to any disclaimer, the term of this patent is extended or adjusted under 35 U.S.C. 154(b) by 567 days.

(21) Appl. No.: 13/828,941

(22) Filed: Mar. 14, 2013

(65) Prior Publication Data
US 2014/0262734 A1    Sep. 18, 2014

(51) Int. Cl.
| | |
|---|---|
| C02F 1/44 | (2006.01) |
| C02F 9/00 | (2006.01) |
| C02F 1/04 | (2006.01) |
| C02F 1/52 | (2006.01) |
| C02F 1/00 | (2006.01) |
| C02F 103/10 | (2006.01) |

(52) U.S. Cl.
CPC ............... C02F 9/00 (2013.01); C02F 1/048 (2013.01); C02F 1/5236 (2013.01); C02F 1/001 (2013.01); C02F 1/441 (2013.01); C02F 2103/10 (2013.01)

(58) Field of Classification Search
CPC .......... C02F 9/00; C02F 1/001; C02F 1/048; C02F 1/441; C02F 1/5236; C02F 2103/10; F26B 3/16; C01B 33/22; C01B 33/24

USPC ............................................. 203/10; 210/638
See application file for complete search history.

(56) References Cited

U.S. PATENT DOCUMENTS

| | | | | |
|---|---|---|---|---|
| 3,451,767 | A * | 6/1969 | Saeman | C01D 7/12 423/203 |
| 4,005,987 | A * | 2/1977 | Jury | C01D 5/18 159/4.04 |
| 5,246,593 | A * | 9/1993 | Gallup | B01D 21/30 210/143 |
| 5,283,054 | A * | 2/1994 | Copenhafer | C01D 7/126 23/302 T |
| 5,656,172 | A * | 8/1997 | Kitz et al. | 210/696 |
| 6,733,636 | B1 * | 5/2004 | Heins | 203/1 |
| 6,761,865 | B1 | 7/2004 | Gallup et al. | |
| 2006/0032630 | A1 | 2/2006 | Heins | |
| 2009/0056945 | A1 | 3/2009 | Minnich et al. | |
| 2010/0038081 | A1 | 2/2010 | Gamache et al. | |
| 2012/0213689 | A1 * | 8/2012 | Rittof et al. | 423/421 |
| 2012/0255904 | A1 | 10/2012 | Nagghappan | |
| 2013/0240442 | A1 | 9/2013 | Chidambaran et al. | |

FOREIGN PATENT DOCUMENTS

AU     2010201962 A1 * 12/2010 ............... B01D 1/24

* cited by examiner

*Primary Examiner* — David C Mellon
*Assistant Examiner* — Liam Royce
(74) *Attorney, Agent, or Firm* — Coats and Bennett PLLC

(57) ABSTRACT

A method is provided for treating brine recovered from a coal seam gas operation. The process entails directing brine recovered from a coal seam gas operation to a mixed reactor and mixing an alkaline earth reagent with the brine. This results in the precipitation of alkaline earth salts and silica, which form alkaline earth salt crystals having silica adsorbed thereto. Thereafter, the alkaline earth salt crystals and adsorbed silica are directed to an evaporator that produces a concentrate having the alkaline earth salt crystals and adsorbed silica.

15 Claims, 1 Drawing Sheet

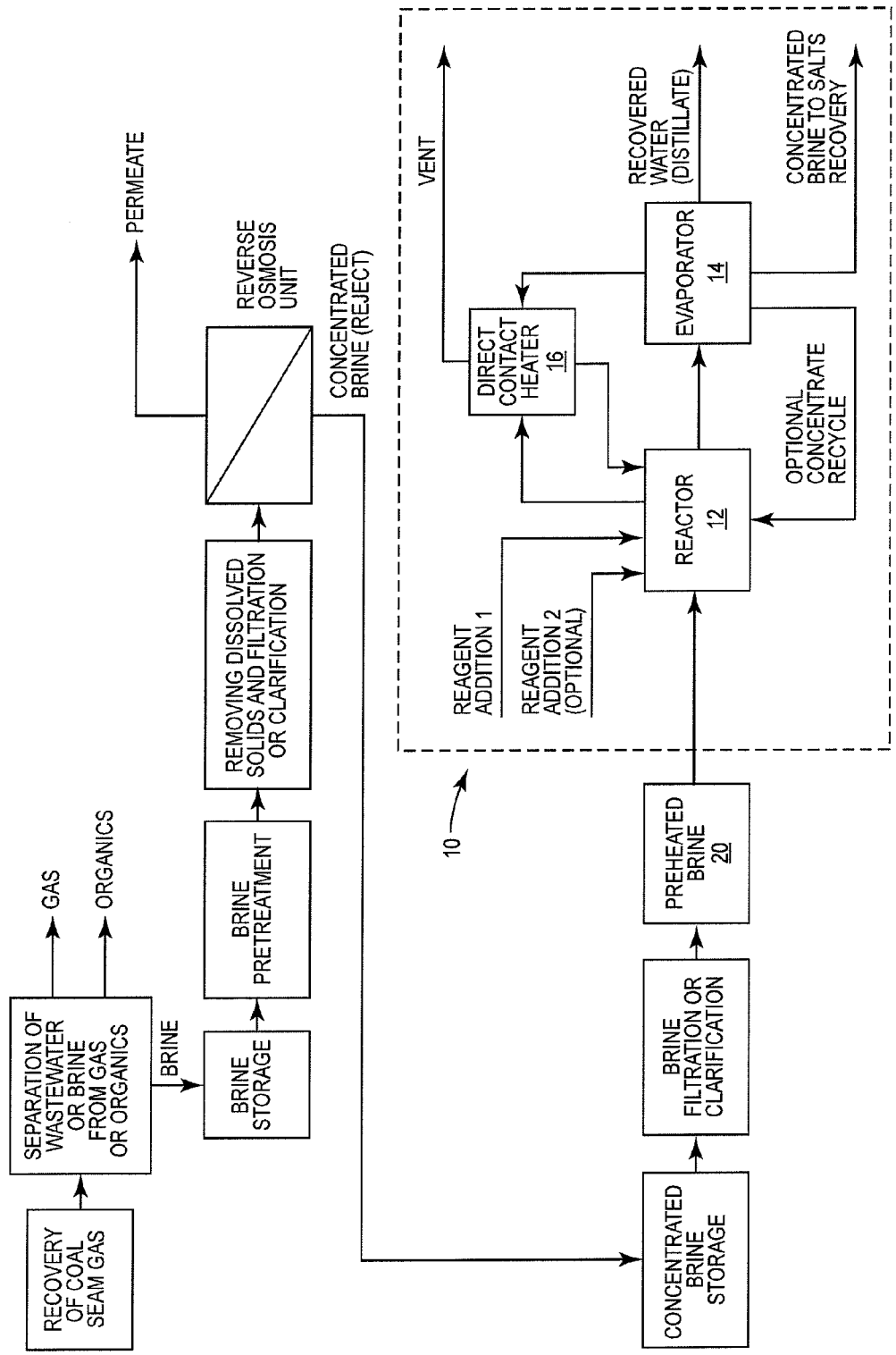

PROCESS FOR TREATING BRINE RECOVERED FROM A COAL SEAM GAS OPERATION

FIELD OF INVENTION

The present invention relates to a method of recovering coal seam gas and treating resulting brine having silica.

BACKGROUND

Coal seam gas, also known as coal bed methane, is natural gas that is adsorbed on coal in coal beds and is a valuable natural resource. To extract coal seam gas, the adsorbed natural gas must be released from the coal. To do so, a well is drilled into the coal seam, which reduces the pressure of the seam and causes the natural gas to be released. The natural gas may then be collected.

Typically, coal seam gas is collected in conjunction with water, called "brine" or "produced water." After extraction, brine may be utilized in other processes or prior to release or reuse, the brine undergoes various treatment processes, such as those for removing contaminants. Because brine from coal seam gas contains a substantial amount of suspended and dissolved contaminants, such as hardness and silica, it is likely that scaling or fouling will occur on treatment equipment absent reducing the concentrations of these species. For example, one particularly harmful scaling contaminant found in brine is silica. Unless silica is removed via a pretreatment process, silica will form damaging scale on equipment used in brine treatment, such as evaporators. Some of the coal seam gas brines also contain a substantial amount of dissolved alkalinity and chloride. It is desirable to recover these components as commercial products rather than leaving them as waste for disposal. Removal of silica is advisable for recovering useful products.

SUMMARY OF THE INVENTION

The present invention relates to a method of treating brine produced in a coal seam gas operation. The brine is pre-treated and directed to a mixed reactor. In the mixed reactor, an alkaline earth reagent is mixed with the brine. This causes the precipitation of alkaline earth hydroxides, salts and silica. The brine, including the alkaline earth hydroxides, salts and silica, is directed to an evaporator that concentrates the brine and produces a concentrate having alkaline earth salts and silica precipitants.

In one embodiment, the brine is preheated and directed to the mixed reactor where the alkaline earth reagent is mixed with the brine, resulting in the co-precipitation of alkaline earth salts and silica from the brine and which forms alkaline earth crystals having silica adsorbed thereto. The brine is directed to a downstream evaporator that concentrates the brine, forming a concentrate having the alkaline earth salt crystals and adsorbed silica. Furthermore, brine from the mixed reactor is circulated through a heater, which heats the brine and, in the process, reduces the concentration of $CO_2$ in the brine and thereby increases the pH of the brine contributing hydroxide (OH) for alkaline earth precipitation.

In another embodiment, the present invention entails a method of recovering a coal seam gas-water mixture from a coal seam gas well. Coal seam gas is separated from the mixture which also yields a brine. Hardness is removed from the brine and thereafter the brine is directed to a membrane separation unit. In the membrane separation unit, the brine is concentrated. After concentrating the brine, the brine is pre-heated and the pre-heated brine is directed to the mixed reactor. In the mixed reactor, an alkaline earth reagent such as magnesium oxide or magnesium chloride is mixed with the brine, causing silica to precipitate and form crystals. Thereafter, the brine with the precipitated silica is directed to a downstream evaporator that further concentrates the brine, producing a concentrate having the precipitated silica crystals.

Other objects and advantages of the present invention will become apparent and obvious from a study of the following description and the accompanying drawings, which are merely illustrative of such invention.

BRIEF DESCRIPTION OF THE DRAWING

FIG. 1 is a schematic illustration of a process for recovering coal seam gas and treating resulting brine.

DESCRIPTION OF EXEMPLARY EMBODIMENT

With further reference to FIG. 1, there is shown therein a method for treating brine produced in a coal seam gas recovery process. This process is indicated generally by the numeral 10 in FIG. 1. As will be discussed later, in a preferred embodiment, there are various pre-treatment processes that take place upstream from the processes depicted in the dotted line area indicated generally by the numeral 10.

Referring to the brine treatment process 10, concentrated brine having silica, and typically alkalinity and chloride is directed to a mixed reactor 12. In the mixed reactor 12, an alkaline earth reagent, such as magnesium oxide or magnesium chloride, is mixed with the brine. This results in the precipitation of silica. The term "silica" is used herein to refer generally to silica-containing compounds, to include precipitants on which silica is adsorbed. There may be various forms of silica precipitants. For example, mixing magnesium oxide or magnesium chloride may result in the precipitation of magnesium silica complexes. In addition, mixing magnesium oxide or magnesium chloride may result in the precipitation of magnesium hydroxide which can adsorb silica and effectively drive silica out of solution. In any event, the alkaline earth reagent causes silica to precipitate and because of the mixing action in the mixed reactor 12, the precipitated silica tends to crystallize and form silica crystals. In the case of using magnesium oxide, magnesium is added in the mixed reactor 12 to maintain a weight ratio of magnesium to silica inside the mixed reactor of approximately about 0.35:1 to 4:1. Other alkaline earth reagents can be used to precipitate solids, including silica. For example, calcium oxide, calcium hydroxide, and other metal oxides such as aluminum oxide or iron oxide might be used. Other reagents, as an option, can be mixed with the brine in the mixed reactor 12. For example, a caustic may be added to increase the pH of the brine.

Brine in the mixed reactor 12 is directed to an evaporator 14. Evaporator 14 may be of various types. One example of a suitable evaporator for use in the present process is a falling film evaporator. It should be noted that in one embodiment, the brine in the mixed reactor is not subjected to a solids separation process prior to being transferred into the evaporator 14. It is contemplated that reactions involving the alkaline earth reagent will continue as the brine is transferred into the evaporator 14. It is expected, in some embodiments, that silica will continue to precipitate while the brine is in the evaporator 14.

Evaporator 14 produces recovered water (distillate) and produces a concentrated brine. In one option, a portion of the concentrated brine, as suggested in FIG. 1, can be recycled to the mixed reactor 12. Because the concentrated brine is highly concentrated with precipitants, the precipitants can serve as seed for the crystallization process that takes place in the mixed reactor 12. By recycling the concentrate to the mixed reactor 12, this effectively reduces the amount of concentrate discharged, and in the end, may increase the concentration of the concentrate produced by the evaporator 14. Concentrated brine produced by the evaporator 14 can be disposed of in appropriate ways or can be further treated. In one process, the concentrated brine can be directed to a salt recovery process where salts are recovered from the concentrated brine. For example, the concentrate can be subjected to a salt recovery process such as that disclosed in U.S. Patent Publication 2012/0213689, the disclosure of which is expressly incorporated herein by reference.

Further, evaporator 14 produces steam. Some of this steam, as shown in FIG. 1, is directed to a heater 16 which, in the case of this embodiment, is a direct contact heater. Brine from the mixed reactor 12 is circulated through the heater 16. In one embodiment, the direct contact heater receives brine at an upper portion thereof and the brine moves downward through the contact heater 16. In one example, while the brine cascades downwardly through the contact heater, Steam, on the other hand, from the evaporator is directed into a lower portion of the contact heater and moves upwardly through the heater and through the downwardly cascading brine. In the process, the steam strips $CO_2$ from the brine and reduces the concentration of $CO_2$, which results in the pH of the brine being increased. In one embodiment, the pH of the brine in the mixed reactor 12 is approximately 9.5-11.0.

Continuing to refer to FIG. 1, the brine treatment process 10 discussed above is typically implemented in a process that recovers coal seam gas from a gas well. In a typical process, a mixture of gas, organics and brine is recovered from a gas well. The mixture is separated into gas, organics and brine which can also be referred to as produced water. See FIG. 1. After the brine is separated from the gas and organics, the brine can be subjected to various pre-treatment processes prior to the brine treatment 10 discussed above. FIG. 1 shows an exemplary pre-treatment process. Various pre-treatment units or processes can be employed to remove dissolved solids as well as suspended solids. Brine separated from the gas and organics will often include a significant concentration of hardness. "Hardness" refers to divalent cations, such as barium, calcium, magnesium, and strontium. Hardness ions are likely to ionically bond with other contaminants in the water to form scaling precipitants at a relatively high pH. For example, at a relatively high pH, calcium ionically bonds with carbonate ($CO_3^{2-}$) to form calcium carbonate scale.

Hardness may be removed by a number of processes. One means of removing hardness is to direct the brine through an ion exchange unit. The ion exchange unit replaces hardness in the water with non-scaling components. For example, an ion exchange unit operating in the sodium mode will replace hardness ions with sodium ions. An ion exchange unit operating in the hydrogen mode replaces hardness ions with hydrogen ions. This mode may also reduce alkalinity found in the produced water. Another means of removing hardness is to utilize lime softening. In lime softening, lime is mixed with the produced water to form hardness precipitants. The precipitated hardness compounds may then be removed by a clarifier, for example. Lime softening may also include additional reagents, such as soda ash ($Na_2CO_3$), to facilitate hardness precipitation.

After hardness removal, the brine is sent to a membrane separation unit. Examples of membrane separation units that may be used include, but are not limited to, nanofiltration units and reverse osmosis ("RO") units. Preferably, the membrane separation unit is at least one RO unit. Membrane separation units typically operate at recovery rates of approximately 90% and produce a permeate stream and a highly concentrated reject stream. This reject stream, after storage, will typically contain suspended solids, dissolved solids including silica, and other contaminants. Typically, the silica concentration of the reject stream is as low as 50 ppm and may be as high as 250 ppm. In an alternate embodiment, an evaporative step may be employed between the membrane separation unit (reverse osmosis unit) and the process 10 for treating the brine. That is, one or more intermediate evaporators can be strategically placed between the reverse osmosis unit and the mixed reactor 12 to evaporate the concentrated brine produced by the reverse osmosis unit. Further in an alternative embodiment, hardness and silica may be removed at an appropriate point between the reverse osmosis unit and the intermediate evaporator or evaporators. The additional concentration by evaporation, to an intermediate end point, is typically operated in a manner that does not precipitate silica in the evaporator or evaporators. These intermediate evaporators may be the vertical falling film type, horizontal falling film type or alternative arrangements. The silica concentration in the intermediate concentrate may be as low as 100 ppm and often in excess of 550 ppm.

Concentrated brine from the RO unit or the intermediate evaporator is directed to a concentrated brine storage facility. The amount of time that the brine is stored varies. Storage may last, for example, for a period of a half day on some occasions. In other operations, storage may last over a month. Concentrated brine from the storage facility is subjected to filtration or clarification. In one embodiment, the brine is directed to a clarifier where solids settle and are separated from the brine.

After clarification or filtration, the brine is directed to a pre-heating unit 20. In the pre-heating unit, the brine is pre-heated, in one example, to a temperature of approximately 120° F. to 220° F. This tends to reduce reagent reaction times. The pre-heating of the brine, as well as the heating process conducted by the direct contact heater 16, can increase the speed of reactions so that the reactions in the mixed reactor 12 can occur in less than one hour, even within five minutes. Also, as discussed above, increased temperature may also reduce carbon dioxide concentrations in the mixed reactor, resulting in an increased pH.

The present invention may, of course, be carried out in other ways than those specifically set forth herein without departing from essential characteristics of the invention. The present embodiments are to be considered in all respects as illustrative and not restrictive.

What is claimed is:

1. A method of treating brine recovered from a coal seam gas operation, comprising:
    a. providing the brine recovered from a coal seam gas operation wherein the brine contains silica;
    b. directing the brine to a mixed reactor;
    c. in the mixed reactor, mixing an alkaline earth reagent with the brine;

d. in the mixed reactor, precipitating alkaline earth salts and silica from the brine and forming alkaline earth salt crystals having silica adsorbed thereto;

e. directing the brine, alkaline earth salt crystals and adsorbed silica to an evaporator and concentrating the brine in the evaporator and producing a distillate and a concentrate having the alkaline earth salt crystals and adsorbed silica;

f. circulating the brine from the mixed reactor through a contact heater and back to the mixed reactor and wherein circulating the brine through the contact heater includes directing the brine downwardly through a portion of the contact heater;

g. directing steam from the evaporator to the contact heater; and h. stripping $CO_2$ from the brine in the mixed reactor and increasing the pH of the brine in the mixed reactor by directing the steam from the evaporator upwardly through the contact heater and contacting the downwardly moving brine.

2. The method of claim 1 wherein reactions that give rise to the alkaline earth salt crystals having silica adsorbed thereto continue in the evaporator.

3. The method of claim 1 wherein the alkaline earth reagent is magnesium oxide, magnesium hydroxide or magnesium chloride.

4. The method of claim 1 including pre-treating the brine upstream of the mixed reactor, and thereafter directing the brine to a reverse osmosis unit and concentrating the brine.

5. The method of claim 1 including directing the concentrate from the evaporator to a salt recovery process and recovering salts from the brine in the salt recovery process.

6. The method of claim 1 including preheating the brine before the brine reaches the mixed reactor.

7. The method of claim 1 including circulating the brine through the direct contact heater to raise the pH of the brine to approximately 9.5 to 11.0.

8. The method of claim 1 wherein the method does not include any solids separation process between the mixed reactor and the evaporator.

9. The method of claim 1 including raising the pH of the brine in the mixed reactor by mixing a caustic with the brine.

10. The method of claim 1 including:
recovering a coal seam gas-water mixture from a coal seam gas well;
separating coal seam gas from the coal seam gas-water mixture which yields the brine;
removing hardness from the brine;
after removing hardness from the brine, directing the brine to a membrane separation unit;
filtering the brine with the membrane separation unit to produce a permeate stream and a reject stream that includes concentrated brine; and
pre-heating the concentrated brine in the reject stream; and
after pre-heating the concentrated brine, directing the concentrated brine to the mixed reactor.

11. The method of claim 1 including recycling at least a portion of the concentrate from the evaporator back to the mixed reactor.

12. The method of claim 4 including positioning one or more intermediate evaporators between the reverse osmosis unit and the mixed reactor for further concentrating the brine.

13. The method of claim 12 including removing hardness and silica from the brine at a point between the reverse osmosis unit and the one or more intermediate evaporators.

14. The method of claim 1 wherein the mixed reactor is located upstream of the evaporator and wherein at least some of the brine directed to the evaporator has passed through the contact heater prior to reaching the evaporator.

15. The method of claim 1 including:
wherein the alkaline earth reagent is magnesium oxide, magnesium hydroxide or magnesium chloride;
pre-treating the brine upstream of the mixed reactor, and thereafter directing the brine to a reverse osmosis unit and concentrating the brine;
directing the concentrate from the evaporator to a salt recovery process and recovering salts from the brine in the salt recovery process; and
pre-heating the brine before the brine reaches the mixed reactor.

* * * * *